(12) United States Patent
Yudanov et al.

(10) Patent No.: US 10,019,283 B2
(45) Date of Patent: Jul. 10, 2018

(54) PREDICTING A CONTEXT PORTION TO MOVE BETWEEN A CONTEXT BUFFER AND REGISTERS BASED ON CONTEXT PORTIONS PREVIOUSLY USED BY AT LEAST ONE OTHER THREAD

(71) Applicant: Advanced Micro Devices, Inc., Sunnyvale, CA (US)

(72) Inventors: Dmitri Yudanov, Austin, TX (US); Sergey Blagodurov, Bellevue, WA (US); Arkaprava Basu, Austin, TX (US); Sooraj Puthoor, Austin, TX (US); Joseph L. Greathouse, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 192 days.

(21) Appl. No.: 14/746,601

(22) Filed: Jun. 22, 2015

(65) Prior Publication Data

US 2016/0371082 A1    Dec. 22, 2016

(51) Int. Cl.
*G06F 9/46* (2006.01)
*G06F 9/30* (2018.01)

(52) U.S. Cl.
CPC ............ *G06F 9/461* (2013.01); *G06F 9/3013* (2013.01); *G06F 9/30145* (2013.01)

(58) Field of Classification Search
CPC ...................................................... G06F 9/461
See application file for complete search history.

(56) References Cited

U.S. PATENT DOCUMENTS

| | | | | |
|---|---|---|---|---|
| 6,205,543 | B1* | 3/2001 | Tremblay | G06F 9/30043 712/228 |
| 6,233,599 | B1* | 5/2001 | Nation | G06F 9/30127 712/207 |
| 6,408,325 | B1* | 6/2002 | Shaylor | G06F 9/462 712/228 |
| 9,378,161 | B1* | 6/2016 | Dalal | G06F 13/16 |
| 9,582,320 | B2* | 2/2017 | Holt | G06F 9/462 |
| 9,652,395 | B2* | 5/2017 | Mese | G06F 12/123 |
| 2003/0046521 | A1* | 3/2003 | Shoemaker | G06F 9/3851 712/228 |
| 2005/0125802 | A1* | 6/2005 | Wang | G06F 9/3009 718/108 |
| 2007/0022428 | A1* | 1/2007 | Yamasaki | G06F 9/461 718/108 |
| 2013/0061239 | A1* | 3/2013 | Lahav | G06F 9/461 718/108 |
| 2014/0189711 | A1* | 7/2014 | Luiz | G06F 9/461 718/106 |

* cited by examiner

*Primary Examiner* — David J. Huisman

(57) ABSTRACT

A processing device includes a first memory that includes a context buffer. The processing device also includes a processor core to execute threads based on context information stored in registers of the processor core and a memory controller to selectively move a subset of the context information between the context buffer and the registers based on one or more latencies of the threads.

18 Claims, 5 Drawing Sheets

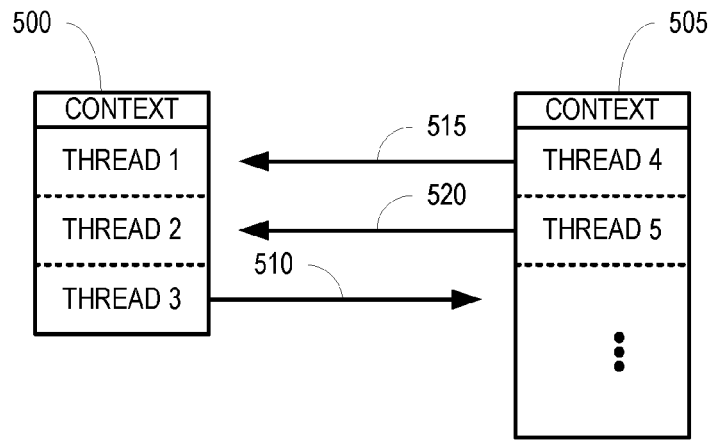
FIG. 5
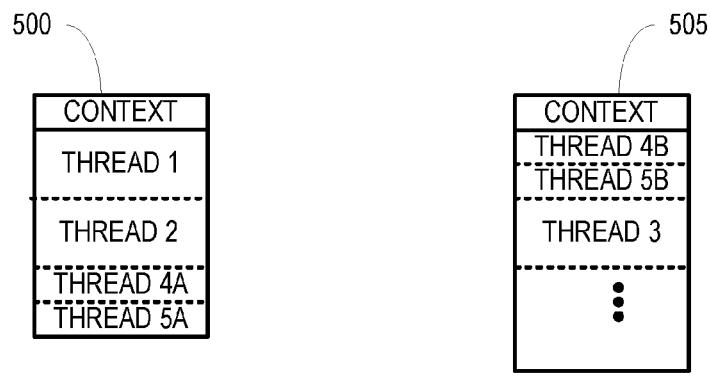
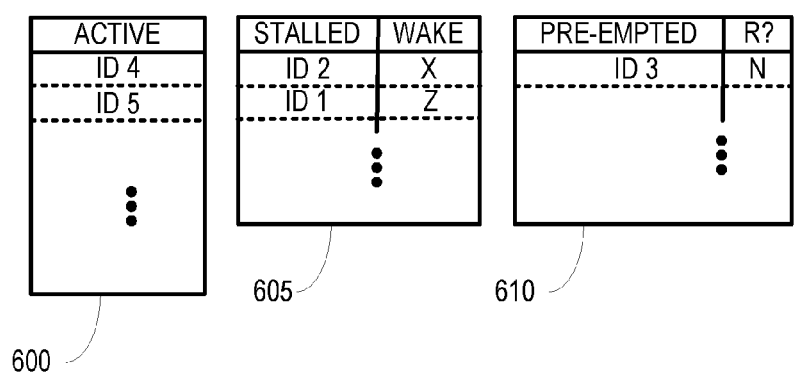
FIG. 6

PREDICTING A CONTEXT PORTION TO MOVE BETWEEN A CONTEXT BUFFER AND REGISTERS BASED ON CONTEXT PORTIONS PREVIOUSLY USED BY AT LEAST ONE OTHER THREAD

BACKGROUND

Field of the Disclosure

The present disclosure relates generally to processing devices and, more particularly, scheduling pipelined instructions in processing devices.

Description of the Related Art

Processing devices such as central processing units (CPUs), graphics processing units (GPUs), or accelerated processing units (APUs) implement pipelines so that operations associated with multiple threads can be concurrently executed in the pipeline. Contexts for each of the threads that are available for execution by the pipeline are stored in a set of registers that are implemented in the processing device. The processing device can hide the latency of individual threads by switching between the threads that are available for execution. For example, a memory (such as a RAM) may take several cycles to return information from the memory to a first thread. The processing device may therefore launch one or more other threads or perform operations associated with previously launched threads while waiting for the information requested by the first thread to be returned to the processing device. However, space and cost considerations limit the number of registers in the processing device, which in turn limits the number of contexts that can be stored for pending threads, and therefore ultimately limits the number of threads that are available for execution. At least in part because of these constraints, the pipelines in processing devices frequently stall (i.e., temporarily stop executing any instructions) because all of the threads that are available for execution are waiting for previous operations to complete. Some applications stall for more than 90% of the time for reasons including limits on the number of available threads, limits on the number of thread groupings that include multiple threads that run the same instruction at the same time, high memory access latencies, limited memory bandwidth, long execution times for operations such as transcendental floating-point operations, and the like.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

FIG. 5 is a diagram depicting the contents of registers and a context buffer according to some embodiments.

FIG. 6 is a diagram depicting the contents of the registers and the context buffer after movement of threads between the registers and the context buffer according to some embodiments.

DETAILED DESCRIPTION

Pipeline stalling can be significantly reduced by allowing more threads (or groups of threads) to send work into the pipeline. Thus, one approach to reduce stalling is to increase the number of thread contexts that are available for scheduling. However, this may not be possible due to constraints on the number of thread contexts that can be scheduled, such as area overhead or register file latency limitations. Stalling may also be reduced by selectively moving context information for a thread from registers in a processor core of a processing device to a context buffer based on a latency associated with the thread. For example, full or partial context information for the thread can be moved from a set of architectural registers to the context buffer in response to a predicted latency of a memory access request from the thread exceeding a threshold. By moving context information from the architectural registers to this context buffer, more space is made available for other contexts.

Full or partial context information for one or more threads may also be selectively moved from the context buffer to the architectural registers. For example, the context information for a thread can be moved from the context buffer to the set of architectural registers in response to context information for another thread being moved from the architectural registers to the context buffer or in response to architectural registers being freed by completion of another thread. Prediction mechanisms may be used to decide whether to move all or some of the context information for the thread. Context information may be selectively moved from the context buffer to the registers based on memory access properties of the thread, e.g., context information for a group of threads that access the same region in a memory may be selectively moved to the registers to facilitate coalescing the memory accesses by the group of threads. In some embodiments, selective movement of the context information between the registers and the context buffer may be controlled by hardware, firmware, or an operating system so that the full context information for threads associated with individual software applications can be selectively moved between the context buffer and the registers in the processor core.

Figure 1:
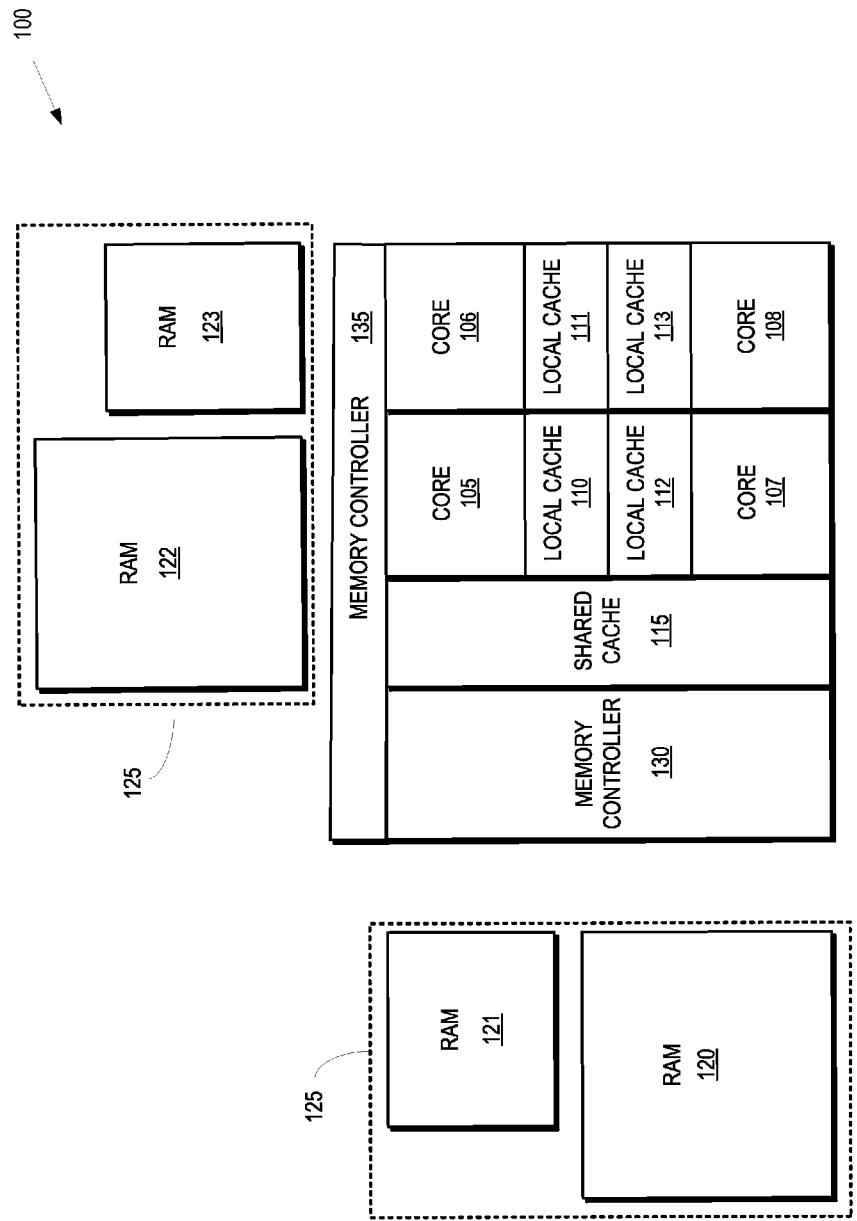
FIG. 1 is a block diagram of a processing system in accordance with some embodiments.

FIG. 1 is a block diagram of a processing system 100 in accordance with some embodiments. The processing system 100 includes multiple processor cores 105, 106, 107, 108 that are referred to collectively as the "processor cores 105-108." The processor cores 105-108 may also be referred to using other terms such as processing device, processing element, compute unit, and the like. The processor cores 105-108 can independently execute instructions concurrently or in parallel. The processing system 100 shown in FIG. 1 includes four processor cores 105-108. However, some embodiments of the processing system 100 may include more or fewer than the four processor cores 105-108 shown in FIG. 1. Some embodiments of the processing system 100 may be formed on a single substrate, e.g., as a system-on-a-chip (SOC). The processing system 100 may be used to implement a central processing unit (CPU), a graphics processing unit (GPU), an accelerated processing unit (APU) that integrates CPU and GPU functionality in a single chip, a field programmable gate array (FPGA), or other device.

The processing system 100 implements caching of data and instructions, and some embodiments of the processing system 100 may therefore implement a hierarchical cache system. Some embodiments of the processing system 100 include local caches 110, 111, 112, 113 that are referred to collectively as the "local caches 110-113." Each of the processor cores 105-108 is associated with a corresponding one of the local caches 110-113. For example, the local caches 110-113 may be L1 caches for caching instructions or data that may be accessed by one or more of the processor cores 105-108. Some embodiments of the local caches 110-113 may be subdivided into an instruction cache and a data cache. The processing system 100 also includes a shared cache 115 that is shared by the processor cores 105-108 and the local caches 110-113. The shared cache 115 may be referred to as a last level cache (LLC) if it is the highest level cache in the cache hierarchy implemented by the processing system 100. Some embodiments of the shared cache 115 are implemented as an L2 cache. The cache hierarchy implemented by the processing system 100 is not limited to the two-level cache hierarchy shown in FIG. 1. Some embodiments of the hierarchical cache system include additional cache levels such as an L3 cache, an L4 cache, or other cache depending on the number of levels in the cache hierarchy.

The processing system 100 also includes a plurality of individual random access memories (RAM) 120, 121, 122, 123, which may be referred to collectively as "the individual RAM 120-123." Although four individual RAM 120-123 are shown in FIG. 1, some embodiments of the processing system 100 may include more or fewer individual RAM 120-123. Some embodiments of the individual RAM 120-123 are used to implement a heterogeneous RAM 125. For example, the plurality of individual RAM 120-123 can share a physical address space associated with the heterogeneous RAM 125 so that memory locations in the individual RAM 120-123 are accessed using a continuous set of physical addresses. The individual RAM 120-103 may therefore be transparent to the operating system of the processing system 100, e.g., the operating system may be unaware that the heterogeneous RAM 125 is made up of more than one individual RAM 120-123. In some embodiments, the physical address space of the heterogeneous RAM 125 may be mapped to one or more virtual address spaces.

The individual RAM 120-123 may have different memory access characteristics. Some embodiments of the individual RAM 120, 122 may be implemented using dynamic RAM (DRAM) that can be accessed at a first memory access bandwidth with a first memory access latency. For example, the individual RAM 120, 122 may be implemented as double data rate type-3 synchronous DRAM (DDR3 SDRAM). Some embodiments of the individual RAM 121, 123 may be implemented as stacked DRAM that is formed of multiple individual memory die that are stacked on top of each other and interconnected with other elements in the processing system 100 by an interposer, a multi-chip module (MCM), or other relatively high bandwidth memory interconnection. Thus, the individual RAM 121, 123 can be accessed at a second memory access bandwidth with a second memory access latency. The second memory access bandwidth and the second memory access latency may differ from the first memory access bandwidth and the first memory access latency, respectively. In some embodiments, the individual RAM 121, 123 have a higher memory access bandwidth and a lower memory access latency than the individual RAM 120, 122. Memory access latencies may be predetermined (e.g., based on the specifications of the corresponding memories) or they may be measured by determining the time required to write information to the memory and subsequently read the information from the memory. The individual RAM 120-123 may also have different memory access protocols, different levels of memory request concurrency, different row lengths (e.g., as measured in bytes per row), and the like. Some embodiments of the processing system 100 may also include other types of memory such as nonvolatile RAM, flash memory, and the like.

The processor cores 105-108 execute instructions associated with one or more threads based on context information stored in registers of the processor cores 105-108. The context information for a thread may include information such as a location of an instruction in a program, pointers to a page table, data retrieved from memory, and the like. Each processor core 105-108 has a limited number of registers available to store context information. The processor cores 105-108 may therefore stall if all of the threads represented by the context information stored in the registers of the processor cores 105-108 are waiting for instructions to complete. Context information for the instructions that have the highest latency (or are expected to complete after the longest time interval) may be swapped out of the registers so that the processor cores 105-108 can initiate instructions associated with other threads while waiting for the high latency instructions to complete. Context information for the high latency threads may therefore be moved from the registers of the processor cores 105-108 to context buffers, which may be implemented in the individual RAM 121, 123 or other memory associated with the processing system 100. Context information for one or more threads that are ready for execution may then be moved from the context buffers to the available registers in the processor cores 105-108.

In some embodiments, memory controllers 130, 135 control movement of the context information between the registers and the context buffers. The memory controllers 130, 135 may also control movement of the context information and other data between the individual RAM 120-123, the shared cache 115, and the local caches 110-113. The memory controllers 130, 135 may be implemented as hardware, firmware, or as part of the operating system of the processing system 100. The memory controllers 130, 135 may therefore move full or partial context information for each thread between the registers and the context buffers dynamically, e.g., at run time based on the current state of the processing system 100. For example, the memory controllers 130, 135 may move full or partial context information between the registers and the context buffers in response to one or more threads stalling were in response to one or more threads completing execution. This is in contrast to conventional register management, such as spill-and-fill techniques that are implemented in the software that defines the instructions executed by the processor cores 105-108 for each thread.

Conventional spill-and-fill techniques encode specific instructions in the software for moving predetermined portions of the context information into and out of the registers at predetermined points in the program flow. Consequently, the conventional spill-and-fill techniques cannot dynamically move context information at run time based on the current state of the processing system 100. Furthermore, in order for a processor core, such as the processor core 105, to execute an instruction associated with a thread, context information for the thread must be available in a register of the processor core 105. Thus, conventional spill-and-fill techniques cannot remove a complete context of a thread because the thread cannot remove all of its own context information from the registers in the processor core 105, whereas some embodiments of the memory controllers 130, 135 can transfer complete context information for a thread from the registers to the context buffer because the memory controllers 130, 135 are implemented as hardware, firmware, or as part of the operating system of the processing system 100. As used herein, the term "complete context information" is understood to refer to all of the context information associated with a thread including context information that is required to execute instructions associated with the thread.

Figure 2:
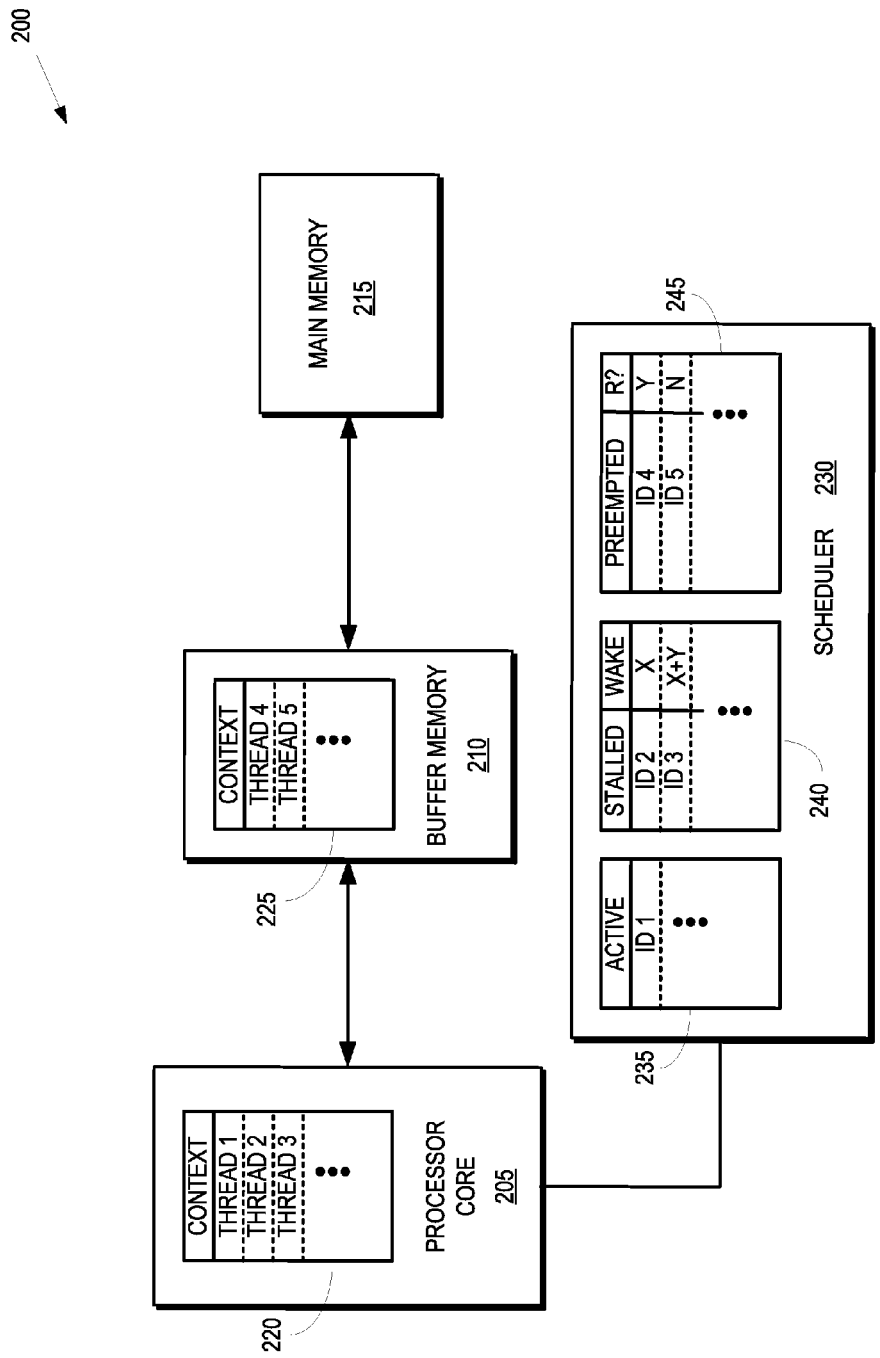
FIG. 2 is a block diagram of a portion of the processing system of FIG. 1 according to some embodiments.

FIG. 2 is a block diagram of a portion 200 of a processing system according to some embodiments. The portion 200 may be implemented in some embodiments of the processing system 100 shown in FIG. 1. The portion 200 includes a processor core 205 that is connected to a buffer memory 210, and a main memory 215. The processor core 205, buffer memory 210, and main memory 215 in the embodiment shown in FIG. 2 are connected so that information is passed between the processor core 205 and the main memory 215 via the buffer memory 210. However, in some embodiments the processor core 205, buffer memory 210, and main memory 215 may be connected so that information can be passed directly between the processor core 205 and either the buffer memory 210 or the main memory 215. The processor core 205, buffer memory 210, or main memory 215 may be used to implement some embodiments of the processor cores 105-108, the stacked DRAM 121, 123, or the DRAM 120, 122 shown in FIG. 1.

The processor core 205 implements a set of registers 220 to store context information for one or more threads that can be executed by the processor core 205. For example, the registers 220 include context information for three threads (Thread 1, Thread 2, Thread 3) so that instructions in these threads are available for execution by the processor core 205. The context information stored in the registers 220 may include complete contexts for the threads or partial contexts that include the portions of the complete contexts that are needed to execute the current instruction in the thread. Although the context information in the registers 220 is associated with individual threads in this example, other embodiments of the registers 220 may store context information associated with groups of threads that may be referred to as wavefronts, ways, workgroups, and the like. The registers 220 may represent architectural registers or physical registers.

The buffer memory 210 implements a context buffer 225 to store context information for one or more threads such as Thread 4 and Thread 5. Threads cannot be scheduled for execution in the processor core 205 directly out of the context buffer 225. Context information is therefore moved between the context buffer 225 and the registers 220. For example, some or all of the context information is moved from the context buffer 225 to one or more of the registers 220 prior to scheduling the corresponding thread for execution in the processor core 205. Context information can also be moved to the context buffer 225 from the registers 220 or from the main memory 215. For example, context information for a thread may be moved from the registers 220 to the context buffer 225 in response to the thread stalling in the processor core 205. For another example, context information for a thread may be moved from the main memory 215 to the context buffer 225 to free up space in the registers 220 prior to moving the context information from the context buffer 225 to the registers 220 so that the thread may be scheduled for execution in the processor core 205.

Some embodiments of the buffer memory 210 have different characteristics than the main memory 215. For example, the buffer memory 210 may be implemented using a different process technology than the main memory 215, a higher density of memory elements than the main memory 215, or it may support a higher bandwidth interconnection than the main memory 215. The memory access speed of the buffer memory 210 may be higher than the memory access speed of the main memory 215, and so the memory access latency of the buffer memory 210 may be lower than the memory access latency of the main memory 215. The processor core 205 may be able to access information in the registers 220 faster than it can access information in the buffer memory 210, but the processor core 205 may also be able to access information in the buffer 210 faster than it can access information in the main memory 215. As discussed herein, the buffer memory 210 may be implemented as stacked DRAM and the main memory 215 may be implemented as DDR3 DRAM.

A scheduler 230 is used to schedule threads in the processor core 205 based on the context information in the registers 220. Although the scheduler 230 is depicted as an entity separate from the processor core 205, some embodiments of the scheduler 230 may be implemented in the processor core 205. The scheduler 230 may be implemented in some embodiments of processor cores 105-108 or the memory controllers 130, 135. The scheduler 230 stores information indicating identifiers of threads that are ready to be scheduled for execution (active threads) in an active list 235. For example, the active list 235 includes an identifier (ID 1) of a first thread because the context information (Thread 1) for the first thread is stored in the registers 220 and the first thread is ready for execution.

The scheduler 230 stores information associated with stalled threads (e.g., threads that are waiting results of executed instructions) in a stall list 240. For example, the stall list 240 include identifiers (ID 2, ID 3) of second and third threads that have context information (Thread 2 and Thread 3) stored in the registers 220, but which have stalled. The stall list 240 also includes information (WAKE) indicating the wake-up time for the corresponding thread. The wake-up time may be determined based on the latency or expected duration of a time interval until completion of the instruction. For example, the wake-up time of the second thread that encountered an L1 miss (e.g., to the local caches 110-113 shown in FIG. 1) may be set to X, which is the expected memory operation return time from an L2 cache hit (e.g., a hit in the shared cache 115 shown in FIG. 1). For another example, the wake-up time of the third thread that encountered an L2 miss may be set to X+Y, which is the expected memory operation return time to access the main memory (e.g., the individual RAM 120-123 shown in FIG. 1). The scheduler 230 determines the wake-up times for threads based on information received from the processor core 205, such as information indicating cache misses.

The scheduler 230 also maintains information indicating threads that have context information stored in the context buffer 225. For example, a preempted list 245 includes identifiers of threads (ID 4, ID 5) that have context information stored in the context buffer 225. The preempted list 245 also includes information indicating whether the preempted threads are ready for execution, e.g., because an instruction such as a memory access request or transcendental floating-point operation has completed. For example, the preempted list 245 indicates that the fourth thread (ID 4) is ready (Y) for execution but the fifth thread (ID 5) is not yet ready (N) for execution. Context information for the preempted threads that are ready for execution can be moved from the context buffer 225 to the registers 220 so that they may be scheduled for execution in the processor core 205.

Full or partial context information is moved between the registers 220 and the context buffer 225 based on information stored in the active list 235, the stall list 240, or the preempted list 245. For example, as long as there is at least one thread identifier in the active list 235, indicating that at least one thread is available for scheduling on the processor core 205, the scheduler 230 is able to schedule threads for execution. However, if there are no thread identifiers in the active list 235, indicating that all of the threads that have context information in the registers 220 have stalled, the scheduler 230 checks the preempted list 245 for any preempted threads that have become ready for execution. If one or more preempted threads are ready for execution, the scheduler 230 instructs the processor core 205 to move one or more threads from the registers 220 to the context buffer 225. The stalled threads may be selected for preemption based on the wake-up time indicated in the stall list 240. For example, the scheduler 230 may instruct the processor core 205 to move the thread with the highest latency or latest wake-up time from the register 220 to the context buffer 225. The scheduler 230 then instructs the processor core 205 to move one or more ready preempted threads from the context buffer 225 to the registers 220 so that the scheduler 230 can schedule the ready preempted threads for execution by the processor core 205.

The processor core 205 may also selectively move full or partial context information for a thread from the context buffer 225 to the registers 220 in response to events detected by the processor core 205. For example, the processor core 205 can selectively move context information for a thread from the context buffer 225 to the registers 220 in response to context information for another thread being moved from the registers 220 to the context buffer 225. The processor core 205 may also move context information from the context buffer 225 to the registers 220 in response to one or more of the registers 220 being freed by completion of a thread.

Some embodiments of the scheduler 230 are configured to use prediction techniques to determine the portion of the context information that is to be moved between the registers 220 and the context buffer 225. For example, a prediction algorithm may be used to determine a subset of the context information that needs to be moved from the context buffer 225 to the registers 220 so that the corresponding thread can be scheduled for execution on the processor core 205. The prediction algorithm can monitor the behavior of context information previously utilized by other threads to build an average time series profile of the context information that was used by the other threads during execution. The threads used by the prediction algorithm may be identified or grouped by application type, method, kernel, or other characteristics. Some embodiments of the prediction algorithm may use a hashed version (or fingerprint) of the context information to determine if the required portions of the context information are available in the registers 220 or the context buffer 225.

Moving partial context information from the context buffer 225 to the registers 220 conserves space in the registers 220 and may allow context information for a larger number of threads to be stored in the registers 220, relative to the number of threads that can be accommodated in the registers 220 if complete context information is stored for each thread. For example, if the registers 220 include a sufficient number of registers to store complete context information for 10 threads, the same set of registers 220 can store partial context information for 20 threads if the partial context information includes half of the complete context information for the corresponding threads. Thus, reducing the fraction of the complete context information stored in the registers 220 increases the number of threads that are available for scheduling by the scheduler 230 for execution by the processor core 205. Virtual or architectural register to physical register translations may be used to support the use of partial context information in the registers 220. For example, translation may be performed by replacing instruction stream operands in the instruction buffer for data parallel programs with repetitive patterns of memory access.

Some embodiments of the scheduler 230 are configured to select groups of threads for execution in the processor core 205 based upon memory access patterns associated with the threads in the group. For example, threads may be allocated to a group if the threads are accessing the same portion of the main memory 215, such as the same page, block, row, or other subset of the main memory 215. The scheduler 230 may then instruct the processor core 205 to move context information for the threads in the group to the registers 220. The processor core 205 may also move context information for other threads out of the registers 220 and into the context buffer 225 to make room for the group context information. The group of threads may then be executed by the processor 205 to reduce the number of memory access requests to the main memory 215 during execution of the coalesced group of threads. Coalescing the threads into a group in this manner may reduce collisions with requests to the main memory 215 from other threads. Threads may also be coalesced into a group based the applications that generated the threads or priorities of the threads. For example, threads may be coalesced to provide preferential access to applications or kernels that are given higher priority at runtime.

Figure 3:
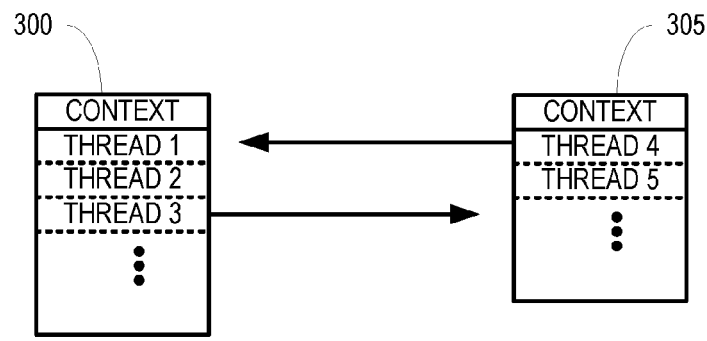
FIG. 3 is a diagram depicting the contents of registers and a context buffer of the processing system of FIG. 1 according to some embodiments.

FIG. 3 is a diagram depicting the contents of registers 300 and a context buffer 305 according to some embodiments. The registers 300 and the context buffer 305 may correspond to some embodiments of the register 220 and the context buffer 225 shown in FIG. 2. The registers 300 include context information for Thread 1, Thread 2, and Thread 3. The context buffer 305 includes context information for Thread 4 and Thread 5. Thus, a scheduler (such as the scheduler 230 shown in FIG. 2) can schedule Thread 1, Thread 2, and Thread 3 out of the registers 300 for execution by a processor core (such as the processor core 205 shown in FIG. 2) but the scheduler is not able to schedule Thread 4 and Thread 5 out of the context buffer 305. In the illustrated embodiment, the threads available for execution in the processor core have stalled. The context information for Thread 3 is selected to be moved from the registers 300 to the context buffer 305 based on a latency of the pending (stalled) instruction associated with the thread, as indicated by the arrow 310. Thread 4 is ready for execution and its context information is selected to be moved from the context buffer 305 to the registers 300, as indicated by the arrow 315. The context information for Thread 4 may be moved from the context buffer 305 to the registers 300 in response to moving the context information for Thread 3 from the registers 300 to the context buffer 305.

Figure 4:
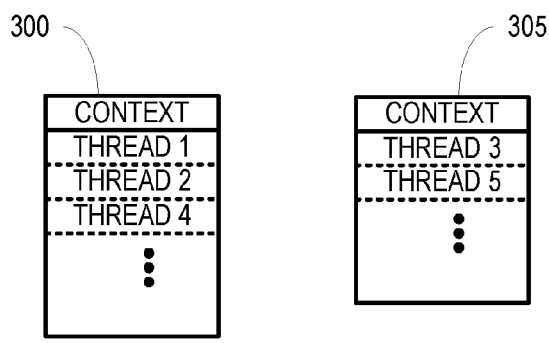
FIG. 4 is a diagram depicting the contents of the registers and the context buffer of FIG. 3 after movement of threads between the registers and the context buffer according to some embodiments.

FIG. 4 is a diagram depicting the contents of the registers 300 and the context buffer 305 after movement of threads between the registers 300 and the context buffer 305 according to some embodiments. The context information for Thread 3 has been moved out of the registers 300 and is now stored in the context buffer 305. The context information for Thread 4 has been moved out of the context buffer 305 and is now stored in the registers 300. The scheduler may therefore schedule Thread 4 out of the registers 305. Thread 3 is no longer available for scheduling while it awaits completion of the instruction operation that caused it to stall.

FIG. 4 also illustrates the state of an active list 400, a stall list 405, and a preempted list 410 that may be maintained by the scheduler, as discussed herein with regard to FIG. 2. The active list 400 includes an identifier (ID 4) of Thread 4 to indicate that Thread 4 is ready to be scheduled for execution in the processor core. The stall list 405 includes identifiers (ID 1, ID 2) of Thread 1 and Thread 2 indicating that these threads have stalled. The stall list 405 also includes information indicating the expected or predicted wake-up times (Z, X) of Thread 1 and Thread 2, respectively. As discussed herein, the wake-up times may be predicted or estimated based on latencies of the stalled instructions for Thread 1 and Thread 2. The preempted list 410 includes identifiers (ID 3, ID 5) of Thread 3 and Thread 5 indicating that the context information for these threads is stored in the context buffer 305. The preempted list 410 also includes information indicating whether the threads are ready for execution. In the illustrated embodiment, neither Thread 3 nor Thread 5 is ready for execution.

FIG. 5 is a diagram depicting the contents of registers 500 and a context buffer 505 according to some embodiments. The registers 500 and the context buffer 505 may correspond to some embodiments of the register 220 and the context buffer 225 shown in FIG. 2. The registers 500 include context information for Thread 1, Thread 2, and Thread 3. The context buffer 505 includes context information for Thread 4 and Thread 5. Thus, a scheduler (such as the scheduler 230 shown in FIG. 2) can schedule Thread 1, Thread 2, and Thread 3 out of the registers 300 for execution by a processor core (such as the processor core 205 shown in FIG. 2) but the scheduler is not able to schedule Thread 4 and Thread 5 out of the context buffer 305. The amount of context information stored in the registers 500 or the context buffer 505 is indicated by the size of the corresponding box.

In the illustrated embodiment, the threads available for execution in the processor core have stalled and the scheduler determines that Thread 4 and Thread 5 can be executed successfully using less than all of the context information for Thread 4 and Thread 5. For example, as discussed herein, the scheduler may implement a prediction algorithm that predicts the portion of the context information that is needed for successful execution of the threads. In order to make room in the registers 500, the complete context information for Thread 3 is selected to be moved from the registers 500 to the context buffer 505 based on a latency of the pending (stalled) instruction associated with the thread, as indicated by the arrow 510. Thread 4 and Thread 5 are ready for execution and partial context information is selected to be moved from the context buffer 505 to the registers 500, as indicated by the arrows 515, 520. The partial context information for Thread 4 and Thread 5 may be moved from the context buffer 505 to the registers 500 in response to moving the context information for Thread 3 from the registers 500 to the context buffer 505. Although the complete context information for Thread 3 is moved out of the registers 500, some embodiments may move partial context information for Thread 3 out of the registers 500. For example, partial context information for Thread 3 can be moved out of the registers 500 to make room for partial context information for one other thread, such as Thread 4 or Thread 5.

FIG. 6 is a diagram depicting the contents of the registers 500 and the context buffer 505 after movement of threads between the registers 500 and the context buffer 505 according to some embodiments. The complete context information for Thread 3 has been moved out of the registers 500 and is now stored in the context buffer 505. Partial context information for Thread 4 (referred to herein as Thread 4A) has been moved out of the context buffer 505 and is now stored in the registers 500. The other portion of the context information (Thread 4B) remains in the context buffer 505. Partial context information for Thread 5 (referred to herein as Thread 5A) has also been moved out of the context buffer 505 and is now stored in the registers 500. The other portion of the context information (Thread 5B) remains in the context buffer 505. The scheduler may therefore schedule Thread 4 and Thread 5 out of the registers 505 using the partial context information Thread 4A or Thread 5A.

FIG. 6 also illustrates the state of an active list 600, a stall list 605, and a preempted list 610 that may be maintained by the scheduler, as discussed herein with regard to FIG. 2. The active list 600 includes identifiers (ID 4, ID 5) of Thread 4 and Thread 5 to indicate that Thread 4 and Thread 5 are ready to be scheduled for execution in the processor core. The stall list 605 includes identifiers (ID 1, ID 2) of Thread 1 and Thread 2 indicating that these threads have stalled. The stall list 605 also includes information indicating the expected or predicted wake-up times (Z, X) of Thread 1 and Thread 2, respectively. As discussed herein, the wake-up times may be predicted or estimated based on latencies of the stalled instructions for Thread 1 and Thread 2. The preempted list 610 includes an identifier (ID 3) of Thread 3 indicating that the context information for Thread 3 is stored in the context buffer 505. The preempted list 610 also includes information indicating whether the threads are ready for execution. In the illustrated embodiment, Thread 3 is not ready for execution.

Figure 7:
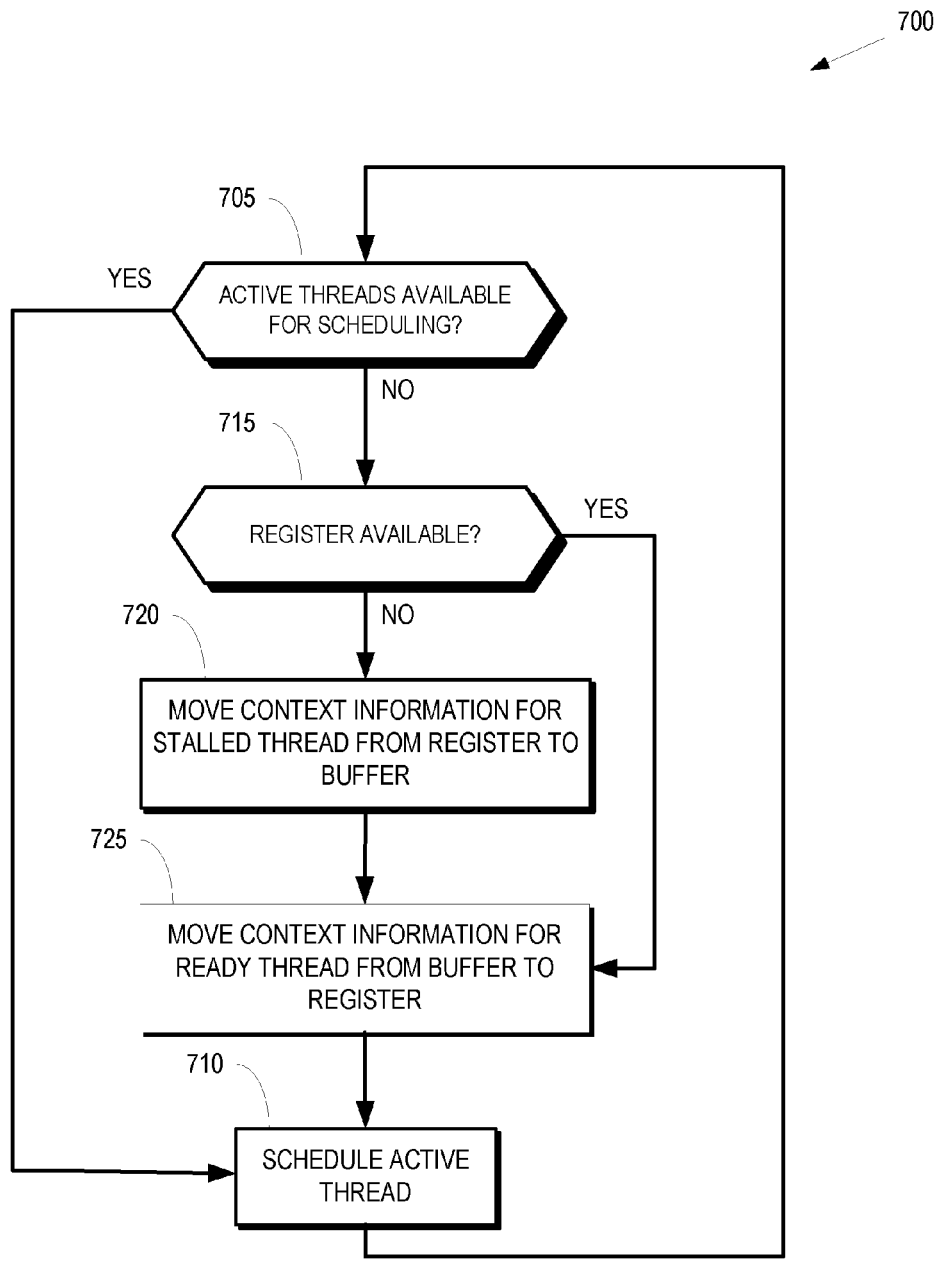
FIG. 7 is a flow diagram of a method for moving context information between registers and a context buffer according to some embodiments.

FIG. 7 is a flow diagram of a method 700 for moving context information between registers and a context buffer according to some embodiments. The method 700 may be implemented in some embodiments of the processing system 100 shown in FIG. 1 or the portion 200 of the processing system shown in FIG. 2. At block 705, a scheduler determines whether active threads are available for scheduling for execution by a processor core. As discussed herein, the scheduler may determine whether the active threads are available using an active list maintained by the scheduler. If one or more active threads are available for scheduling, the scheduler schedules one of the available active threads for execution by the processor core at block 710. If no active threads are available for scheduling, the scheduler determines (at decision block 715) whether one or more registers are available to store context information in the processor core.

If the scheduler determines that one or more registers are available, context information for a thread that is ready to execute is moved from the context buffer to the available register or registers at block 720. If no registers (or an insufficient number of registers) are available for storing context information, context information for one or more stalled threads are moved from the registers to the context buffer at block 725. One or more of the stalled threads may be selected for preemption based upon a latency or a wake-up time associated with the thread. In response to moving the context information for the stalled thread or threads to the context buffer, context information for the ready thread is moved from the context buffer to the available register or registers at block 720. As discussed herein, the context information may include a complete context for the thread or may be limited to partial context information for the thread. Once the full or partial context information for the ready thread has been moved to the registers, the scheduler schedules the active thread for execution by the processor core at block 710.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. An apparatus, comprising:
    a first memory comprising a context buffer;
    a processor core to execute threads based on context information stored in registers of the processor core; and
    a memory controller circuit to selectively move a portion of a first context for a first thread between the context buffer and the registers based on a latency of the first thread, wherein the portion includes less than all of the first context for the first thread, and wherein the portion of the first context is predicted based on portions of contexts previously used by one or more other threads.

2. The apparatus of claim 1, wherein the memory controller circuit is to selectively move the portion of the first context from the registers to the context buffer in response to a latency of an instruction associated with the first thread exceeding a first threshold.

3. The apparatus of claim 2, wherein the memory controller circuit is to selectively move the portion of the first context from the registers to the context buffer in response to a latency of a memory access request issued by the first thread exceeding the first threshold.

4. The apparatus of claim 2, wherein the memory controller circuit is to selectively move a portion of a second context for a second thread from the context buffer to the registers.

5. The apparatus of claim 4, wherein the memory controller circuit is to selectively move the portion of the second context from the context buffer to the registers in response to at least one of context information for another thread being moved from the registers to the context buffer or a subset of the registers being freed by completion of at least one other thread.

6. The apparatus of claim 1, wherein the memory controller circuit is to selectively move a complete context for a third thread between the context buffer and the registers.

7. The apparatus of claim 1, further comprising:
    a second memory, wherein the first memory has at least one of a higher memory access bandwidth and a lower memory access latency than the second memory, and wherein the memory controller circuit is to selectively move a portion of a third context stored in the second memory to the context buffer in the first memory.

8. The apparatus of claim 7, wherein the memory controller circuit is to selectively move context information for a thread group including more than one thread in response to determining that the threads in the thread group access a region in the second memory.

9. A method, comprising:
    executing one or more threads using context information stored in registers of a processor core; and
    selectively moving a portion of a first context for a first thread between a context buffer in a first memory and the registers based on a latency of the first thread, wherein the portion includes less than all of the first context, wherein the portion of the first context is predicted based on previous portions of contexts previously used by one or more other threads.

10. The method of claim 9, wherein selectively moving the portion of the first context comprises moving the portion of the first context from the registers to the context buffer in response to a latency of an instruction associated with the first thread exceeding a first threshold.

11. The method of claim 10, wherein moving the portion of the first context comprises moving the portion of the first context from the registers to the context buffer in response to a latency of a memory access request issued by the first thread exceeding the first threshold.

12. The method of claim 9, further comprising:
    moving a portion of a second context for a second thread from the context buffer to the registers.

13. The method of claim 12, wherein moving the portion of the second context comprises moving the portion of the second context from the context buffer to the registers in response to at least one of context information for another thread being moved from the registers to the context buffer or a subset of the registers being freed by completion of at least one other thread.

14. The method of claim 9, further comprising:
moving a complete context for a third thread between the context buffer and the registers.

15. The method of claim 9, further comprising:
moving fourth context information stored in a second memory to the context buffer in the first memory, wherein the first memory has at least one of a higher memory access bandwidth and a lower memory access latency than the second memory.

16. The method of claim 15, further comprising:
selectively moving context information for a thread group including more than one thread in response to determining that the threads in the thread group access a region in the second memory.

17. A non-transitory computer readable medium embodying a set of executable instructions, the set of executable instructions to manipulate a computer system to perform a portion of a process to fabricate at least part of a processor, the processor comprising:

a first memory comprising a context buffer;

a processor core to execute threads based on context information stored in registers of the processor core; and a memory controller circuit to selectively move a portion of a first context for a first thread between the context buffer and the registers based on a latency of the first thread, wherein the portion includes less than all of the first context, and wherein the portion of the first context is predicted based on previous portions of contexts previously used by one or more threads.

18. The non-transitory computer readable medium of claim 17, the processor further comprising:

a second memory, wherein the first memory has at least one of a higher memory access bandwidth and a lower memory access latency than the second memory, and wherein the memory controller circuit is to selectively move context information stored in the second memory to the context buffer in the first memory.

* * * * *